US010193853B1

(12) United States Patent
Phipps

(10) Patent No.: US 10,193,853 B1
(45) Date of Patent: Jan. 29, 2019

(54) WEB BROWSER OR WEB SERVICE BASED DETECTION OF INTERNET FACING DNS SERVER

(71) Applicant: Workday, Inc., Pleasanton, CA (US)

(72) Inventor: Charles T. W. Phipps, Diablo, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/339,696

(22) Filed: Oct. 31, 2016

(51) Int. Cl.
*H04L 29/12* (2006.01)
*H04L 29/06* (2006.01)
*H04L 29/08* (2006.01)

(52) U.S. Cl.
CPC ...... *H04L 61/1511* (2013.01); *H04L 61/2007* (2013.01); *H04L 61/609* (2013.01); *H04L 67/02* (2013.01); *H04L 67/32* (2013.01); *H04L 67/42* (2013.01)

(58) Field of Classification Search
CPC ... H04L 61/1511; H04L 67/32; H04L 61/609; H04L 67/02; H04L 67/42; H04L 61/2007
USPC .......................... 709/203, 219, 232, 235, 245
See application file for complete search history.

(56) References Cited

U.S. PATENT DOCUMENTS

| 7,151,966 | B1 | 12/2006 | Baier | |
|---|---|---|---|---|
| 7,725,561 | B2* | 5/2010 | Bhogal | H04L 29/12066 709/203 |
| 8,635,340 | B1* | 1/2014 | Schneider | H04L 61/3015 709/219 |
| 9,595,077 | B1 | 3/2017 | Le | |
| 2002/0009992 | A1 | 1/2002 | Jensen | |
| 2002/0129137 | A1 | 9/2002 | Mills | |
| 2003/0002484 | A1 | 1/2003 | Freedman | |
| 2003/0055990 | A1 | 3/2003 | Cheline | |
| 2003/0217104 | A1 | 11/2003 | Hamdan | |
| 2005/0105798 | A1* | 5/2005 | Nguyen | G06F 17/30247 382/181 |
| 2005/0108391 | A1* | 5/2005 | Boss | H04L 41/5009 709/224 |
| 2008/0222306 | A1* | 9/2008 | Bhakta | H04L 29/12066 709/245 |
| 2008/0301313 | A1* | 12/2008 | Bhogal | H04L 29/12066 709/230 |
| 2010/0057416 | A1 | 3/2010 | Peterman | |
| 2010/0058366 | A1* | 3/2010 | Swildens | G06F 11/3414 719/329 |
| 2011/0012917 | A1 | 1/2011 | Souza | |
| 2011/0153867 | A1 | 6/2011 | Van De Ven | |
| 2012/0089920 | A1 | 4/2012 | Eick | |
| 2014/0380076 | A1 | 12/2014 | Weissmann | |
| 2015/0161257 | A1 | 6/2015 | Shivaswamy | |
| 2016/0112284 | A1* | 4/2016 | Pon | H04L 61/1511 709/224 |

(Continued)

*Primary Examiner* — David R Lazaro
*Assistant Examiner* — Berhanu Shitayewoldetadik
(74) *Attorney, Agent, or Firm* — Van Pelt, Yi & James LLP

(57) ABSTRACT

A web browser or web service based system for determining the IP address of the Internet facing DNS server on a given network includes an input interface and a processor. The input interface is configured to receive a request for a web page from a client system. The request includes a testing URL. The processor is configured to determine an ID code from the testing URL; determine the IP address of the Internet facing DNS server used, based at least in part on the ID code; and provide the IP address of the Internet facing DNS server using the web page.

22 Claims, 9 Drawing Sheets

(56) References Cited

U.S. PATENT DOCUMENTS

2016/0226731 A1  8/2016  Maroulis
2017/0003984 A1  1/2017  Gatson

* cited by examiner

WEB BROWSER OR WEB SERVICE BASED DETECTION OF INTERNET FACING DNS SERVER

BACKGROUND OF THE INVENTION

A content provider serving content to users distributed around the world often utilizes a content delivery network. The content delivery network comprises a distributed set of servers allowing a user to access content from a server that is physically nearby with the aim of obtaining faster performance than accessing a copy of the content located on a single centralized server or one that is physically distant from the user. In the event a user has an improperly configured DNS infrastructure, it is possible for the content delivery network to improperly determine the location of the user, creating a problem in which the content is delivered from a server distant to the user resulting in the delivery being much slower than desired or advertised.

BRIEF DESCRIPTION OF THE DRAWINGS

Various embodiments of the invention are disclosed in the following detailed description and the accompanying drawings.

DETAILED DESCRIPTION

Figure 1:
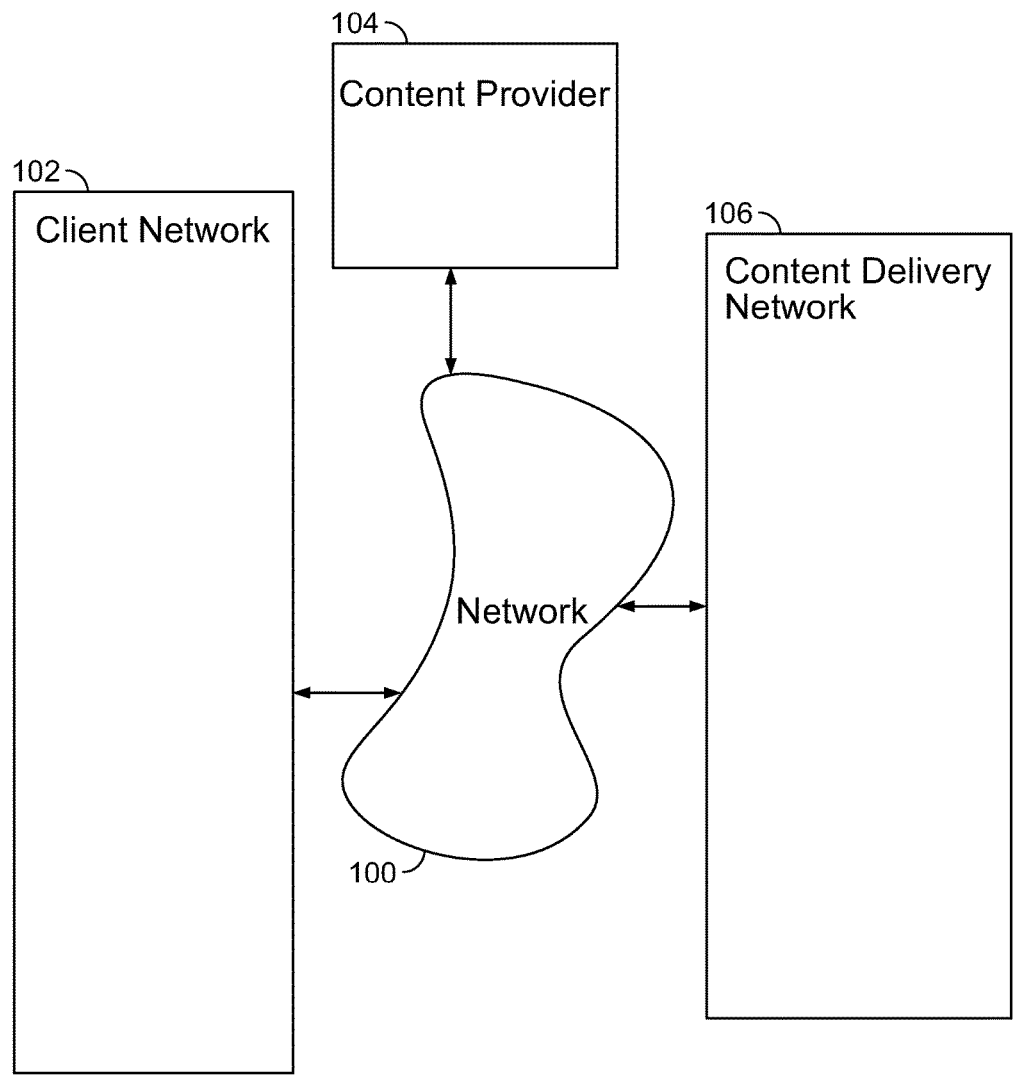
FIG. 1 is a block diagram illustrating an embodiment of system for determining the internet protocol (IP) address of the Internet facing domain name server (DNS) server on a given network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining IP address of an Internet facing DNS server is disclosed. The system comprises an input interface and a processor. The input interface is configured to receive a request for a web page from a client system. The request includes a detection URL. The processor is configured to determine an ID code from the detection URL; determine the IP address of the Internet facing DNS server based at least in part on the ID code; and provide the IP address of the Internet facing DNS server using the web page.

In some embodiments, a system for determining the Internet protocol (IP) address of the Domain Name System (DNS) server is used at the current point in time by an Internet connected computer (herein referred to as the "Internet facing DNS server") to relay DNS requests to the Internet. The system comprises a plurality of components that working together provide an interface to receive a request for a web page from a client system, wherein the request and its processing steps include a DNS lookup, a universal record locator (URL), a processor to determine an identifying (ID) code from the URL, a process to determine the IP address of the Internet facing DNS server that was used to complete the request based at least in part on the ID code, and a process to provide the IP address of the Internet facing DNS server via the resulting synchronously served web page.

To provide a client or customer with service, a content provider ideally provides content from a server located close to the client or customer system. A frequently used piece of information that is utilized to aid in identifying an optimally located content delivery server is the IP address of the Internet facing DNS Server. This IP address is mapped to a physical location by the content delivery network (CDN) and this location serves as a proxy for the location of the user. However, client computer systems are sometimes configured in such a way that the DNS server visible to the content delivery system (the user's Internet facing DNS server) is physically remote from the user, resulting in suboptimal location selection by the content delivery network. Given the complex architecture of the DNS system, even technical end-users and local IT administrators are often not aware of which specific DNS server is the user's network's current Internet facing DNS Server and this often cannot be determined by examining the user's computer. Current solutions for determining the Internet facing DNS server have a number of problems including requiring a user to perform unfamiliar or complex commands, requiring a coordination of steps between the user and the content provider, or requiring a level of access to the user's computer that may not be available or difficult to obtain. This often causes information not to be available and subsequent diagnosis of the resulting poor performance to be hindered.

It is not a straightforward task to determine the identity of the DNS server that is used by the network for relaying DNS requests to the Internet. The architecture of the DNS is such that examining the local computer's DNS configuration will likely not reveal the identity of the Internet facing DNS server. Instead, the computer's network connection needs to be used to send various probes to the Internet hosted DNS infrastructure and the responses to those probes examined to find the identity of the Internet facing DNS server. While well-established methods exist to perform these probes using special purpose network tools, these tools require the user to have a higher level of access rights or operational understanding of their computer than would be required to access Internet content via a Web Browser.

In some embodiments, the Internet facing DNS server's IP address is determined from a standard web browser or a web service and without any specialized knowledge on behalf of the user. Knowing the identity of the Internet facing DNS server on the user's network is important in troubleshooting Internet performance issues related to network configuration, particularly when content delivery networks are in use.

In some embodiments, web browser and/or web service based detection of an Internet facing DNS server is disclosed. When a client accesses content provider data via a CDN, the CDN typically determines the client location by determining the location of the Internet facing DNS server used by the client. The CDN typically chooses a server near to the determined client location in order to efficiently deliver content to the client. An Internet facing DNS server is used by the client's network to determine IP addresses associated with hostname component of the universal resource locators (URL) that the client desires to access (e.g., web sites, etc.). In the event the client system or the network or plurality of networks it is connected to is configured in such a way that its associated Internet facing DNS server is located far from it, the CDN may choose a server near the Internet facing DNS server rather than near the client, resulting in suboptimal content delivery performance. The client experiences the suboptimal performance as an issue with the content provider and may contact the content provider looking for a solution. In order to effectively diagnose this problem (e.g., a suboptimally configured client network, wherein the client uses an Internet facing DNS server located physically far from the client), a tool for easily determining the IP address of a client network's Internet facing DNS server is necessary. The simple solution of asking the client the location of the server does not typically work as the client does not typically know how to determine the IP address of their Internet facing DNS server.

In some embodiments, to detect the IP address of the Internet facing DNS server, the client system is instructed to access a web page located at a detection URL via the hypertext transfer protocol (HTTP) or secure hypertext transfer protocol (HTTPS). The hostname component of the detection URL includes an identifying (ID) code component that uniquely identifies the current instance of the test and should be different each time the detection is performed within a reasonable timeframe. The client system accessing the web page performs a DNS lookup of the hostname contained in the detection URL. The client system provides the hostname to its DNS server, which may forward it to one or more DNS servers before it reaches the Internet facing DNS server that actually performs the DNS lookup via the Internet. The Internet facing DNS server eventually contacts the content provider network associated with the hostname and reaches a content provider DNS server to provide the IP address associated with the hostname. The content provider DNS server recognizes the hostname as part of a detection and determines the ID code from the hostname (e.g., by extracting the part of the hostname string that is known to be the ID code). The content provider DNS server additionally then determines the IP address of the DNS server that made the request by recording the IP address from which the DNS request originated. This DNS server comprises the Internet facing DNS server whose IP address is to be provided to the client system as the result of the detection. The ID code and Internet facing DNS server IP address are associated and stored in a database. In some embodiments, the ID code and Internet facing DNS server are stored as a key—value pair (e.g., the ID code is provided to the database and the Internet facing DNS server IP address is returned). The content provider DNS server then returns to the client system the IP address of a content provider web server (e.g., the content provider web server associated with the detection URL) in its DNS response. The second step of the client system accessing the web page (e.g., at the detection URL) is to provide a request for the web page at the detection URL to the IP address returned by the DNS lookup (e.g., the IP address of the content provider web server). This second step is performed as a transparent part of the web browser's standard operations and is not typically obvious to the user as a distinct step in accessing the web page. The request made by the web browser is a standard HTTP or HTTPS request which includes both the IP address of the content provider web server and the detection URL (e.g., including the ID code contained in the hostname component of the detection URL). When the content provider web server receives the request, it extracts the ID code from the URL and looks it up in the database, receiving the IP address of the Internet facing DNS server. The content provider web server then creates a dynamic web page including the IP address of the Internet facing DNS server and provides it to the client. In some embodiments, the content provider web server additionally performs geolocation on the IP address of the Internet facing DNS server and provides the location of the Internet facing DNS server to the client. In some embodiments, the content provider web server additionally determines the physical distance from the client to the Internet facing DNS server using the location of the client that is optionally included in the HTTP or HTTPS request (e.g., in the URL and/or the POST body) and provides the distance to the client.

In some embodiments, the dynamic web page returned is in a user readable format and provides a graphical or textual means or combination thereof for the user to understand the results. In various embodiments, the user is provided the IP address of the Internet facing DNS server, the geolocation of the Internet facing DNS server, or the distance between the geolocation of the client and the geolocation of the DNS server.

In some embodiments, the dynamic web page returned includes a visual or other indication to the user of whether the distance between the geolocation of the client and the geolocation of the Internet facing DNS server is excessive and therefore likely to be the source of performance issues.

In some embodiments, the dynamic web page returned may be in machine parsable format such as in extensible markup language (XML) or JavaScript Object Notation (JSON).

In some embodiments, a simple, a no-install, no-administration rights required, automated way of determining the Internet facing DNS server is disclosed. The key goals are to:

Automatically detect the Internet facing DNS server (e.g., not rely on information already in possession of the user or provided by information technology (IT) staff or other personnel);

Not require any local workstation dependencies other than a standard web browser with Internet access;

Not require administrative or any elevated local workstation privileges;

Not require any coordination of efforts between the user and content provider personnel;

Not require the download or installation of software packages or applications;

Allow the client to view the results; and

Automatically report the results to the content provider support, anonymously or de-anonymized if permitted by the client.

In some embodiments, to accomplish these goals, the Internet facing DNS server detection must be possible from within a regular web browser, by accessing a standard web page. In some embodiments, a page that gathers a variety of network configuration and performance details is hosted at an address (e.g., http://example.com/performance-troubleshooter). This page includes access to the DNS server detection URL or a web service that accesses this URL and presents the results to the user. The other parts of the tool exist to present a friendly and simple interface to the end user and to accomplish the other goals stated above such as automatically reporting the results to content provider support.

In some embodiments, a process for determining the IP address of an Internet facing DNS server begins with a client accessing an initiation web page via a standard web browser. In various embodiments, the client indicates a desire to access by typing in to a standard web browser a web page URL, clicking a link, or any other appropriate access triggering. The initiation web page comprises code to initiate the detection. In some embodiments, the initiation web page comprises instructions to the user for determining and verifying a client geolocation. In some embodiments, the client geolocation is ultimately compared to an Internet facing DNS server geolocation in order to inform the client of their physical distance to the Internet facing DNS server. In various embodiments, the initiation web page comprises instructions for the client to generate an ID code for later identification of the request. In various embodiments, the ID code is generated randomly, pseudorandomly, by contacting a content provider server and requesting an ID code, deterministically from the current time, or in any other appropriate way. The initiation web page also includes a URL string whose hostname component includes the ID code to form a detection URL. The URL string comprises a URL directed to a content provider web server.

In some embodiments, to accomplish the Internet facing DNS server detection, a web service is used. In some embodiments, this web service is called via a URL, and the results are returned in JavaScript object notation (JSON) format, extensible markup language (XML) format or another machine parsable format.

In some embodiments, the format of the detection URL is: https://<random-host-name>.<dedicated detection subdomain>.<TLD>—Where <random-host-name> is an ID code that differs each time a detection is performed within a reasonable time period, <dedicated detection subdomain> is a subdomain of the TLD dedicated to performing Internet facing DNS server detection, and <TLD> is a top-level domain. Each component conforms to the requirements of an Internet hostname described in an appropriate Internet protocol (e.g., RFC 1123). The ID code could be generated by a random number or string generator on the client, be specified by the end-user or even be as simple as high-resolution timestamp. The dedicated detection subdomain could be a name that describes the detection service and the TLD could be the TLD of the entity hosting the tool. For example:

https://bhg6xpykmcp5fzpc.dnswhoami.example.com.

In some embodiments, when this URL is opened, a JSON, XML or other machine parsable structured response is returned by the server that contains the IP address of the Internet-facing DNS server that was detected, plus additional (and optional) geographical details of its location as returned by a variety of IP-based geolocation services and/or details of the extension mechanisms for DNS (EDNS0) client-subnet information included in the DNS query (in the event that the DNS servers in the query flow support EDNS0). This result is then used by the web application to both display the results to the user and to automatically send the results to the content provider support.

By standard Internet convention, the DNS lookup and HTTP request phases of fetching a URL are completely independent, to a level where they are served by different servers with no knowledge of each other. In some embodiments, the mechanism to detect the Internet-facing DNS Server requires the DNS and Web Server to be tightly interlocked. It involves four key components: a parent domain authoritative DNS server, a modified authoritative DNS server, a web server, and a database server.

In some embodiments, the DNS server hosting the name server (NS) records for the parent of the domain used to host the detection system must delegate a subdomain to a specially modified DNS server. In the example above, the DNS server for "example.com" delegates the "dnswhoami.example.com" domain to a specially modified DNS server. This delegation ensures that all hostnames under the detection system's domain are resolved by the modified DNS server, and are therefore subject to the enhanced processing described herein. A single hostname cannot be used to host this service as the hostname portion of the fully qualified hostname is used as a unique identifier for the query.

In some embodiments, the modified DNS server is a standard authoritative DNS server with a modification so that queries for "A" (or "AAAA" if IPv6 is used) trigger the execution of code that records the IP address of the server from which it received the request in a database using the hostname as the key, and then responds with the IP address of a web server that provides the response. The modified DNS server acts as the "intercept" for the DNS request, detects the IP address of the Internet-facing DNS server and passes it to the database for recording and later retrieval by the web server when the browser's hypertext transmission protocol (HTTP) or secure hypertext transmission protocol (HTTPS) request is received.

In some embodiments, the web server responds to the browser's HTTP or HTTPS request by looking up and responding with the details of the DNS interception performed by the modified DNS server. This provides a browser-compatible way of reporting the results of the interception in a way that can be visible to the user, and accessible from JavaScript code running within the web page without the need for DNS specific or other special purpose software to be installed or run on the user's computer.

In some embodiments, the database server acts as a temporal store for hostname/data pairs generated by the modified DNS server. The web service must be able to retrieve the results of the DNS intercept in order to return the results to the user. These results cannot be returned by the DNS server as it can only return a DNS response and by convention, raw DNS responses cannot be accessed by JavaScript code in a web page, so the database server "caches" the results for retrieval by the web server very soon (typically a fraction of a second) after the DNS lookup is complete.

FIG. 1 is a block diagram illustrating an embodiment of system for determining the internet protocol (IP) address of an Internet facing domain name server (DNS) server on a given network. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client network 102, content provider 104, and content delivery network 106 communicate via network 100. In the example shown, client network 102 comprises a network of a client organization to content provider 104. In some embodiments, a client organization comprises an organization, members of which receive content from content provider 104. In some embodiments, client network 102 comprises a distributed network of computers. In some embodiments, client network 102 comprises computers at physically distant locations (e.g., in multiple countries, in multiple continents, etc.). Content provider 104 comprises a content provider for providing content to one or more client networks (e.g., client network 102). In some embodiments, content provider 104 provides content to client networks via content delivery network 106. In some embodiments, content provider 104 comprises a system for determining an IP address of an Internet facing DNS server. Content delivery network 106 comprises a content delivery network for delivering content from a content provider (e.g., content provider 104). In some embodiments, content delivery network 106 comprises a plurality of geographically distributed content delivery servers for delivering content. In some embodiments, content delivery network 106 determines an appropriate content delivery server based on the location of a client requesting content and delivers content to the client using the determined content delivery server.

Figure 2:
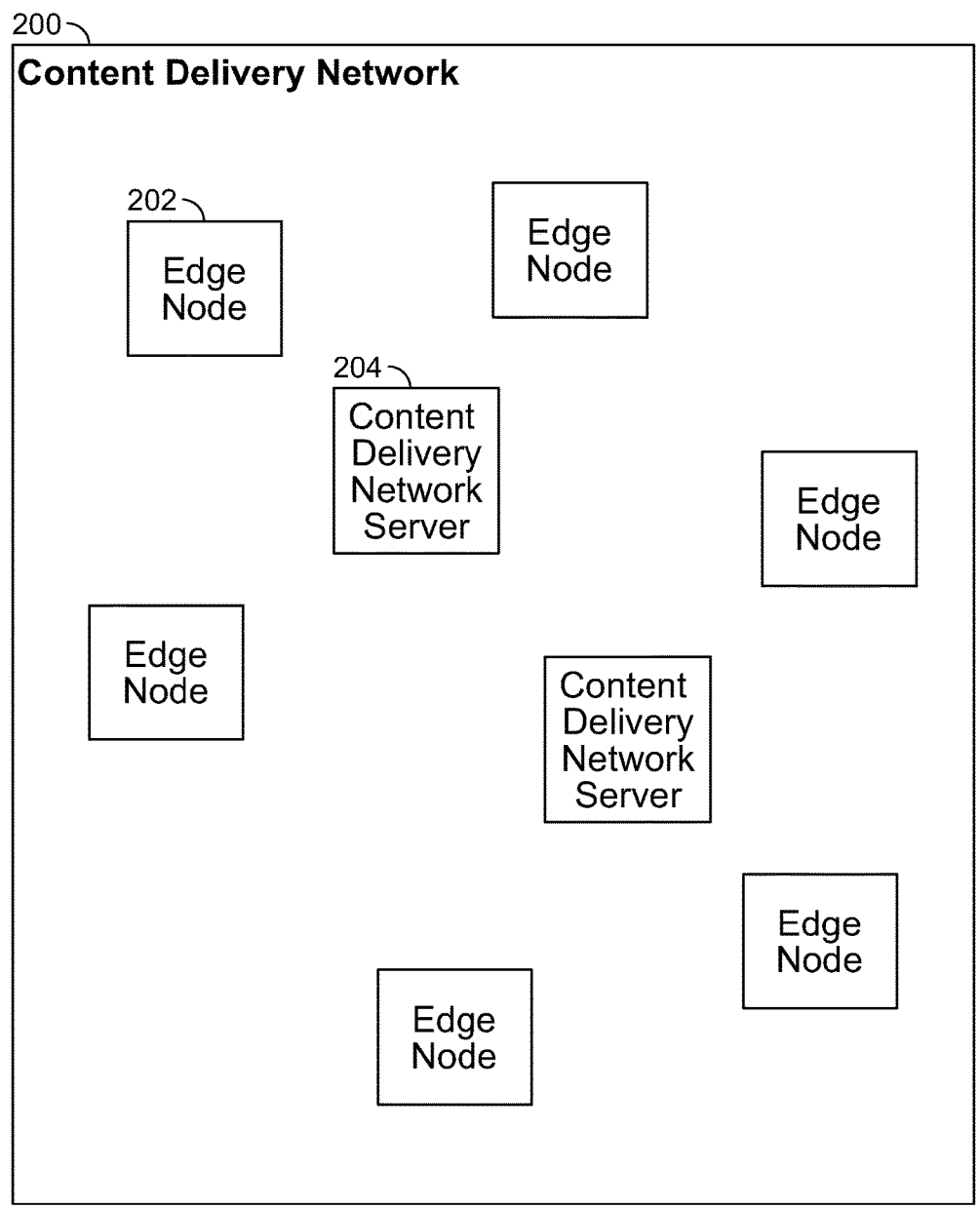
FIG. 2 is a block diagram illustrating an embodiment of a content delivery network.

FIG. 2 is a block diagram illustrating an embodiment of a content delivery network. In some embodiments, content delivery network 200 comprises content delivery network 106 of FIG. 1. In the example shown, content delivery network 200 comprises a content delivery network for delivering content to geographically distributed clients (e.g., a set of clients distributed over a wide geographic area). Content delivery network 200 comprises a plurality of edge nodes (e.g., edge node 202) for delivering content to clients. The plurality of edge nodes are distributed over a wide geographical area (e.g., across a plurality of countries, a plurality of continents, etc.). Content delivery network 200 comprises a plurality of content delivery network servers (e.g., content delivery network server 204). In various embodiments, each content delivery network server provides content to one or more edge nodes to keep the edge node content up to date, monitors the performance of the edge nodes, determines which edge node should deliver content to a particular client, or performs any other appropriate content delivery network server task.

Figure 3:
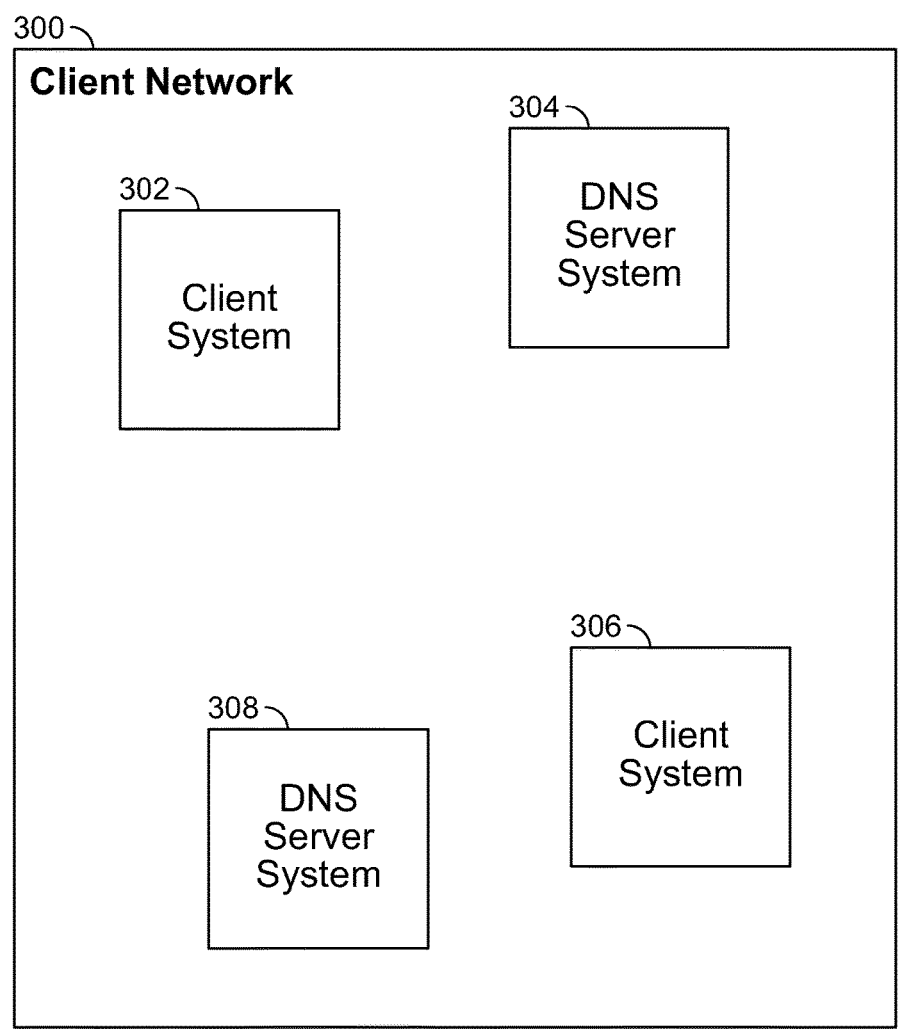
FIG. 3 is a block diagram illustrating an embodiment of a client network.

FIG. 3 is a block diagram illustrating an embodiment of a client network. In some embodiments, client network 300 of FIG. 3 comprises client network 102 of FIG. 1. In various embodiments, client network 300 comprises one or more client systems (e.g., client system 302 or client system 306) and DNS server systems (e.g., DNS server system 304 or DNS server system 308), and any other appropriate systems. In some embodiments, a client system comprises a system accessed by a user for accessing a network (e.g., an intranet within client network 300, an external network, the Internet, etc.) for working with data and/or applications. In some embodiments, a DNS server system comprises a system for executing DNS requests to retrieve IP addresses via the Internet. In some embodiments, the systems of client network 300 are geographically distributed (e.g., distributed over a wide geographical area).

Figure 4A:
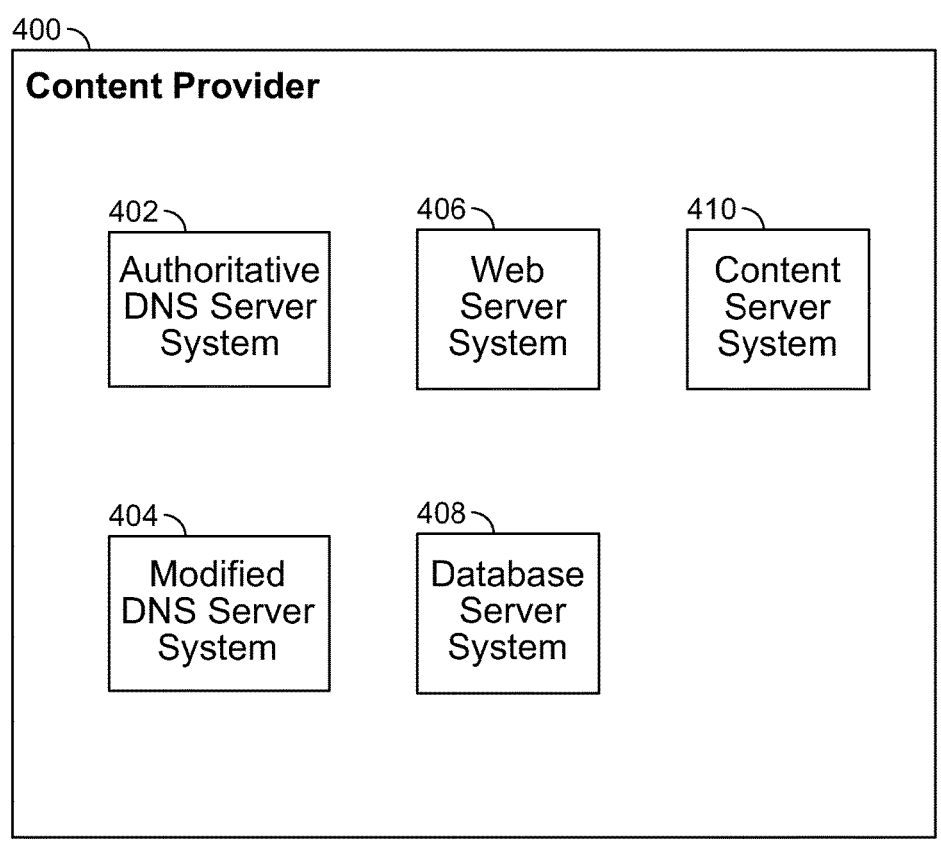
FIG. 4A is a block diagram illustrating an embodiment of a content provider.

FIG. 4A is a block diagram illustrating an embodiment of a content provider. In some embodiments, content provider 400 comprises content provider 104 of FIG. 1. In some embodiments, content provider 400 comprises a content provider for providing content (e.g., database data, audio data, video data, or any other appropriate content). In some embodiments, content provider 400 comprises a content provider for determining an IP address of an Internet facing DNS server. In the example shown, content provider 400 comprises authoritative DNS server system 402. In some embodiments, authoritative DNS server system 402 comprises a DNS server system for responding to DNS requests directed to content provider 400. In some embodiments, in the event a DNS request is received by content provider 400, authoritative DNS server system 402 processes the request and provides a DNS response (e.g., an IP address) to the requesting system. In some embodiments, in the event authoritative DNS server system receives a DNS request within a specific detection subdomain (e.g., "dnswhoami.example.com" within the content provider domain of "example.com"), authoritative DNS server system 402 responds to the client directing them to make their request to modified DNS server system 404. In various embodiments, modified DNS server system 404 comprises a system for determining an ID code from a hostname, for determining an IP address of the requesting DNS server, for providing an ID code and an IP address to database server system 408 for storage, or for any other appropriate purpose. Web server system 406 comprises a web server system for providing a web page. In some embodiments, web server system 406 comprises a system for determining an IP address. In various embodiments, web server system comprises a web server system for receiving a request for a web page at a URL from a client system, determining an ID code from a requested URL, determining an IP address based at least in part on the ID code, requesting an IP address from database server system 408, creating a web page including the IP address, determining geolocation information from the IP address, including geolocation information in the web page, providing the web page to the requesting client system, or for performing any other appropriate web server system task. Content server system 410 comprises a content server system for storing and/or providing content. In some embodiments, content server system provides content directly to a client system. In some embodiments, content server system provides content to a content distribution network for providing to a client system. In various embodiments, the elements of content provider 400 comprise separate systems, are combined into a single system, or are combined into a plurality of systems in any appropriate way. In various embodiments, authoritative DNS server system 402 and modified DNS server system 404 are combined into a single DNS server system or are implemented as separate systems or the authoritative DNS server may be hosted by a third party. In various embodiments, database server system 408 is implemented as part of web server system 406, as part of modified DNS server system 404, as a separate system, or in any other appropriate way.

Figure 4B:
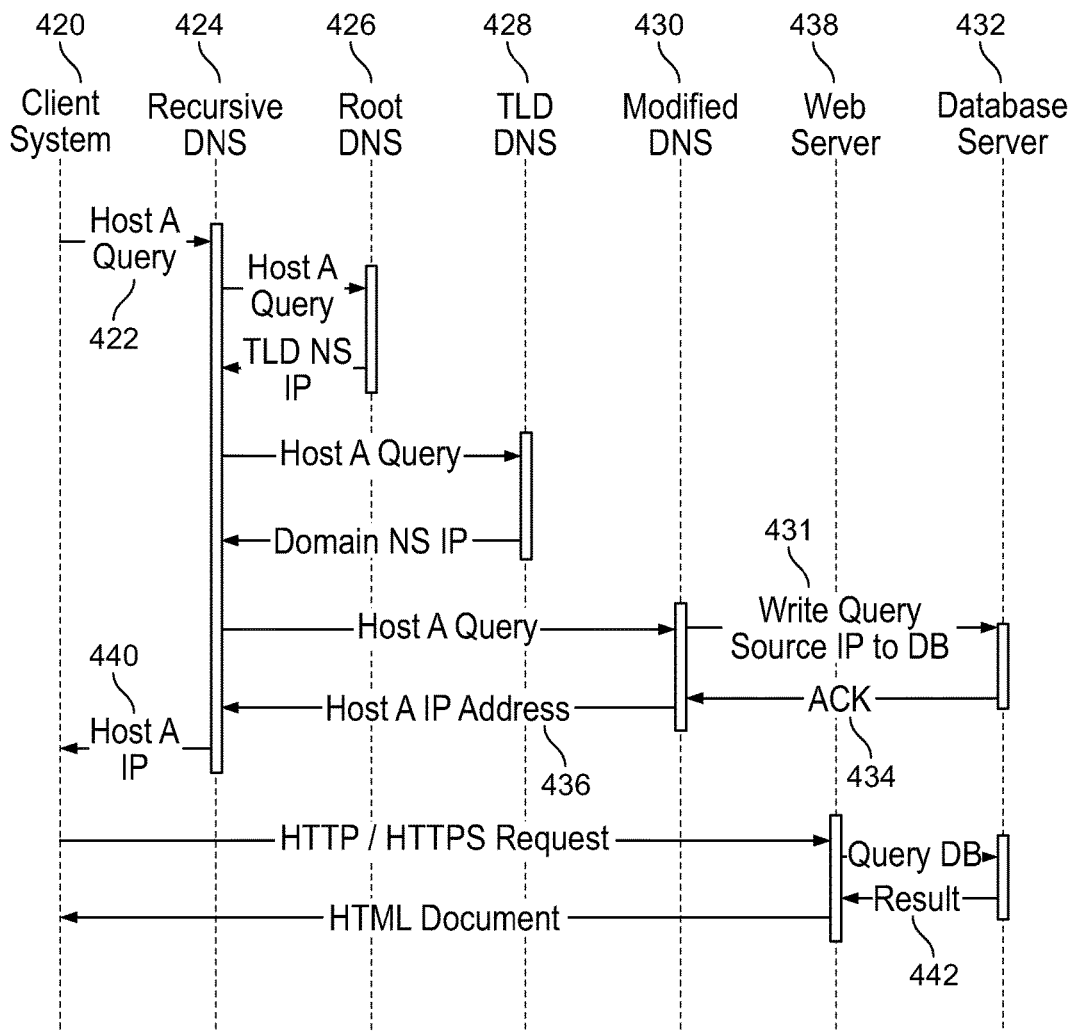
FIG. 4B is a diagram illustrating an embodiment of a system for determining the internet protocol (IP) address of the Internet facing domain name server (DNS) server on a given network.

FIG. 4B is a diagram illustrating an embodiment of a system for determining the internet protocol (IP) address of an Internet facing domain name server (DNS) server on a given network. In some embodiments, the process of FIG. 4B is implemented using the system of FIG. 1. In the example shown, the system for determining an IP address of an Internet facing DNS server comprises the following steps:

1. Client system 420 generates a query (e.g., a query that includes a random string of numbers/letters that complies with the Internet protocol—for example, RFC 1123—and concatenates the random string with the discovery domain name—for example, ".dnswhoami.example.com"); ☐
2. Client system 420 (e.g., specifically a web browser running on client system 420) initiates a DNS Address ("A") query (Host A Query 422) to resolve the IP address for the hostname. In this example, "test123.dnswhoami.example.com" is used as the hostname, where "test123" stands for the random portion that the client system previously generated; ☐
3. The DNS query passes through the user's network's infrastructure until it reaches recursive DNS server 424 that is Internet facing and that will actually perform the lookup via the Internet DNS infrastructure; ☐
4. Recursive DNS server 424 performs the lookup of the name by standard DNS recursion; it queries Root DNS server 426 for the IP address of the DNS server that services the top level domain (TLD DNS server 428) (e.g., ".com" in this case) and continues recursively until it reaches modified DNS server 430 that has been delegated authority over the domain (e.g., "dnswhoami.example.com"); ☐
5. Modified DNS server 430 notes the IP address from which the query originated and the hostname being queried. Prior to returning a DNS answer, it calls database server 432 (e.g., write query source IP to DB 431) to write a simple key/value pair entry with the key being the unqualified hostname (e.g., "test123") and the value being the IP address from which the query originated; ☐
6. Once the DB server confirms that the key/value has been written (e.g., ACK 434), the modified DNS server returns the Host IP address 436 of Web Server 438 as a response to the DNS "A" query with a very short (typically zero) time to live (TTL) instruction; ☐
7. Recursive DNS server 424 receives this response, and notes the zero TTL so it will not cache the answer. It passes the answer to the client system (e.g., Host A IP 440); ☐
8. Web Browser of client system 420 opens a connection to the IP address of Web Server 438 it received in host A IP 440 and requests the default ("/") page. Since modern browsers use the hypertext transfer protocol (HTTP—for example, HTTP 1.1 protocol), the hostname that the Web Browser is attempting to connect to is also passed with this request. It will look similar to: ☐
GET/HTTP/1.1
Host: test123.dnswhoami.example.com
9. Web Server 438 performs a look up to database server 432 using the unqualified portion of the hostname in the HTTP 1.1 GET request as the key (e.g. "test123". Database server 432 returns the value that was stored in write query source IP to DB 431 (e.g., the IP address from which the DNS server received the query); ☐
10. Web Server 438 performs optional geolocation and other convenience actions based on this IP address, such as locating the internet service provider (ISP) and autonomous system (AS) responsible for the address, its approximate geolocation and other details that may be of use to the user; ☐
11. Web Server 438 structures the result using user viewable markup, or JSON, XML or another machine parsable format and returns it to the client system; ☐
12. Database server 432 can delete the key/value pair once it has been retrieved since it is not going to be re-used. This deletion can be either immediate upon initial fetch, or as a periodic cleanup operation. As long as either the value has been retrieved by web server 438 (e.g., result 442) or sufficient time has passed so that the flow can be considered interrupted (e.g., 3 minutes in an extremely latency prone environment), the key/value pair is no longer useful and can be deleted.

Figure 5:
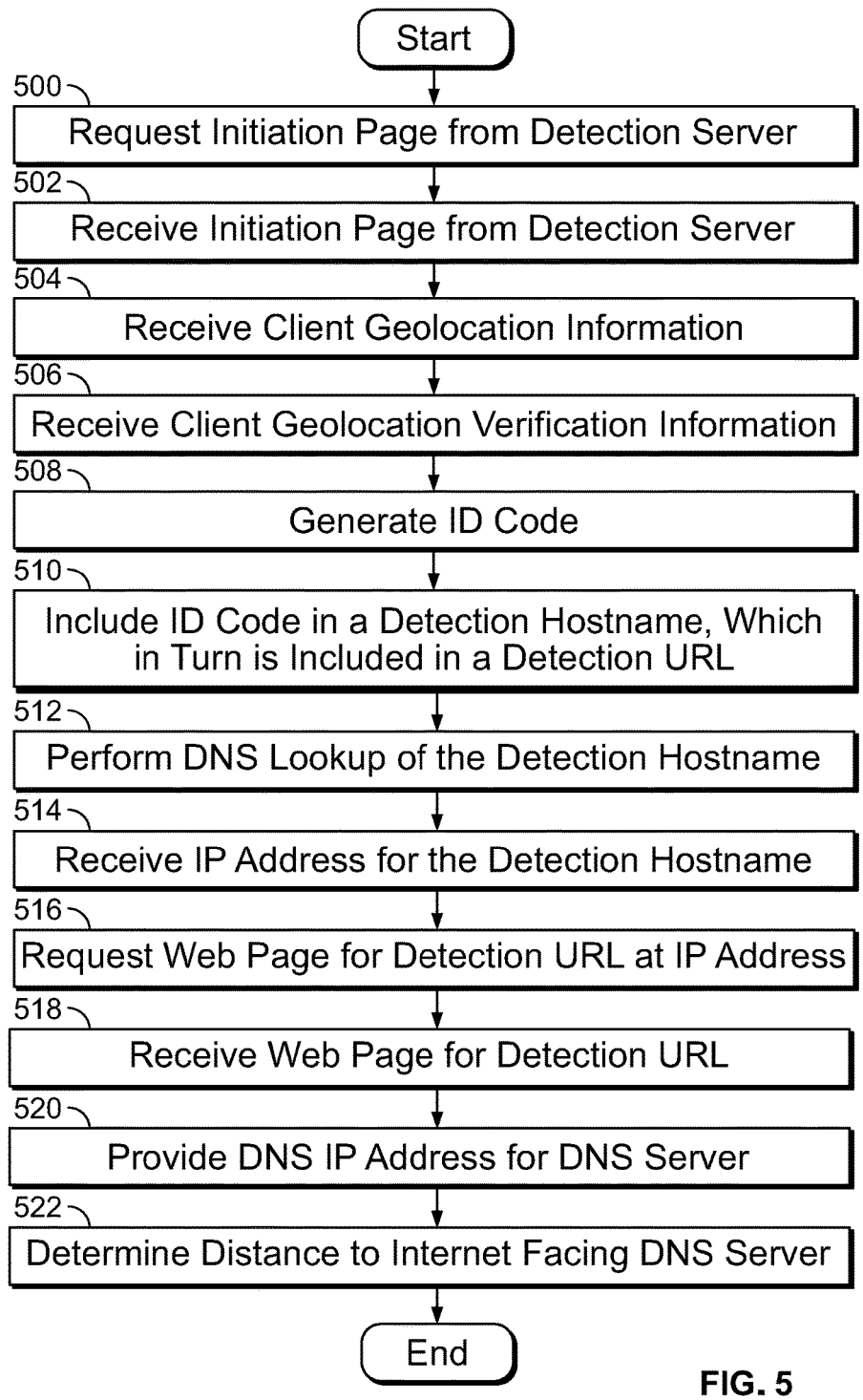
FIG. 5 is a flow diagram illustrating an embodiment of a process for a client system.

FIG. 5 is a flow diagram illustrating an embodiment of a process for a client system. In some embodiments, the process of FIG. 5 is executed by a client system (e.g., client system 302 of FIG. 3) in communication with a user. In some embodiments, the process of FIG. 5 comprises a process for determining an IP address of the Internet facing DNS server utilizing a system for determining an IP address. In the example shown, in 500, an initiation page is requested from a detection server. In various embodiments, requesting the initiation page comprises following a web link, typing in a URL, following a web redirect, or requesting the initiation page in any other appropriate way. In 502, the initiation page is received from the detection server. In some embodiments, the initiation page comprises instructions for performing a client geolocation. In 504 client geolocation information is received (e.g., from looking up the client IP address using a geolocation server). In 506, client geolocation verification information is received (e.g., the user is prompted to verify that the geolocation is correct). In some embodiments, client geolocation verification information comprises a verification that the client geolocation information is correct. In some embodiments, client geolocation verification information comprises corrected geolocation information. In 508, an ID code is generated (e.g., according to instructions in the initiation page). In various embodiments, the ID code is generated randomly, pseudorandomly, by querying a server, deterministically from the current time, or in any other appropriate way. In 510, the ID code is included in a detection hostname which in turn is included in a detection URL. In some embodiments, the detection URL comprises the hostname within a detection subdomain within a content provider domain. In 512, the client system performs a DNS lookup of the detection hostname contained within the detection URL (e.g., as a first step to retrieving a web page at the detection URL). In some embodiments, performing a DNS lookup of the detection hostname comprises providing the detection hostname to a DNS server for DNS lookup. In some embodiments, the DNS server further forwards the request before DNS lookup is performed. In 514, the client system receives an IP address for the detection hostname (e.g., as the response to the DNS lookup). In some embodiments, the IP address comprises the IP address for a content provider web server. In 516, a web page for the detection URL is requested at the IP address. In 518, the web page for the detection URL is received. In some embodiments, the web page comprises the IP address of the Internet facing DNS server associated with the client. In some embodiments, the web page comprises geolocation information associated with the Internet facing DNS server. In 520, the IP address is provided for the Internet facing DNS server. For example, the IP address for the Internet facing DNS server based at least in part on the information associated with the web page received for the testing URL. In some embodiments in 522, a distance to the Internet facing DNS server is determined (e.g., by determining the distance between client geolocation information and geolocation information associated with the Internet facing DNS server).

Figure 6:
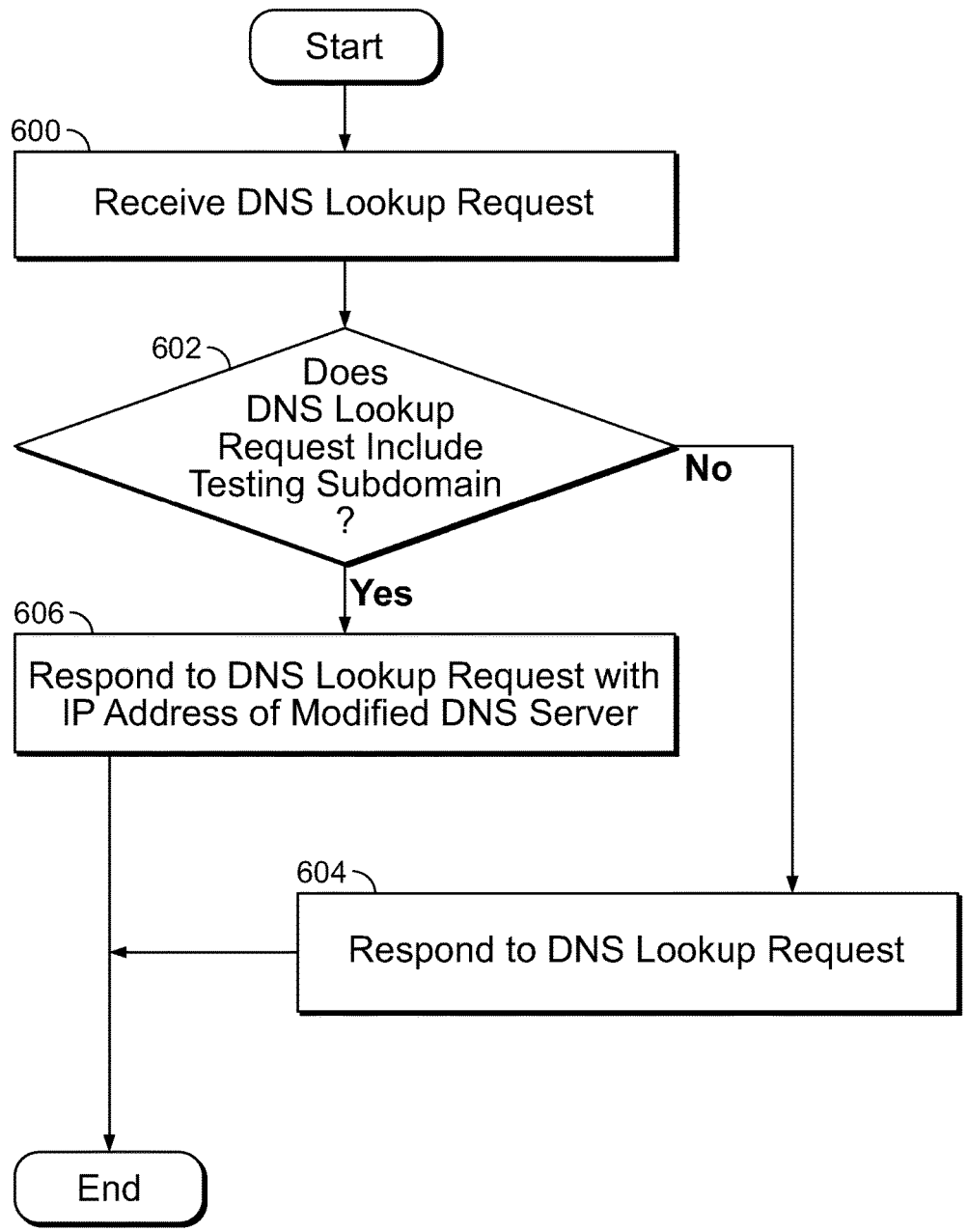
FIG. 6 is a flow diagram illustrating an embodiment of a process for an authoritative DNS server system.

FIG. 6 is a flow diagram illustrating an embodiment of a process for an authoritative DNS server system. In some embodiments, the authoritative DNS server system comprises an authoritative DNS server system of a content provider. In some embodiments, an authoritative DNS server system comprises a content provider DNS server system. In some embodiments, the process of FIG. 6 is executed by authoritative DNS server system 402 of FIG. 4. In the example shown, in 600, a DNS lookup request is received. In some embodiments, the DNS lookup request is received from an Internet facing DNS server. In some embodiments, the DNS lookup request comprises a DNS lookup request for a content provider domain or a subdomain within a content provider domain. In 602, it is determined whether the DNS lookup request includes a testing subdomain. In some embodiments, the testing subdomain comprises a testing subdomain within a content provider domain (e.g., "dnswhoami.example.com" within the content provider domain of "example.com"). In the event it is determined that the DNS lookup request includes the testing subdomain, control passes to 606. In 606, the DNS lookup request is responded to with IP address of modified DNS server (e.g., modified DNS server system 404 of FIG. 4), and the process ends. In the event it is determined in 602 that the DNS lookup request does not include the testing subdomain, control passes to 604. In 604, the authoritative DNS server responds to the DNS lookup request, and the process ends.

Figure 7:
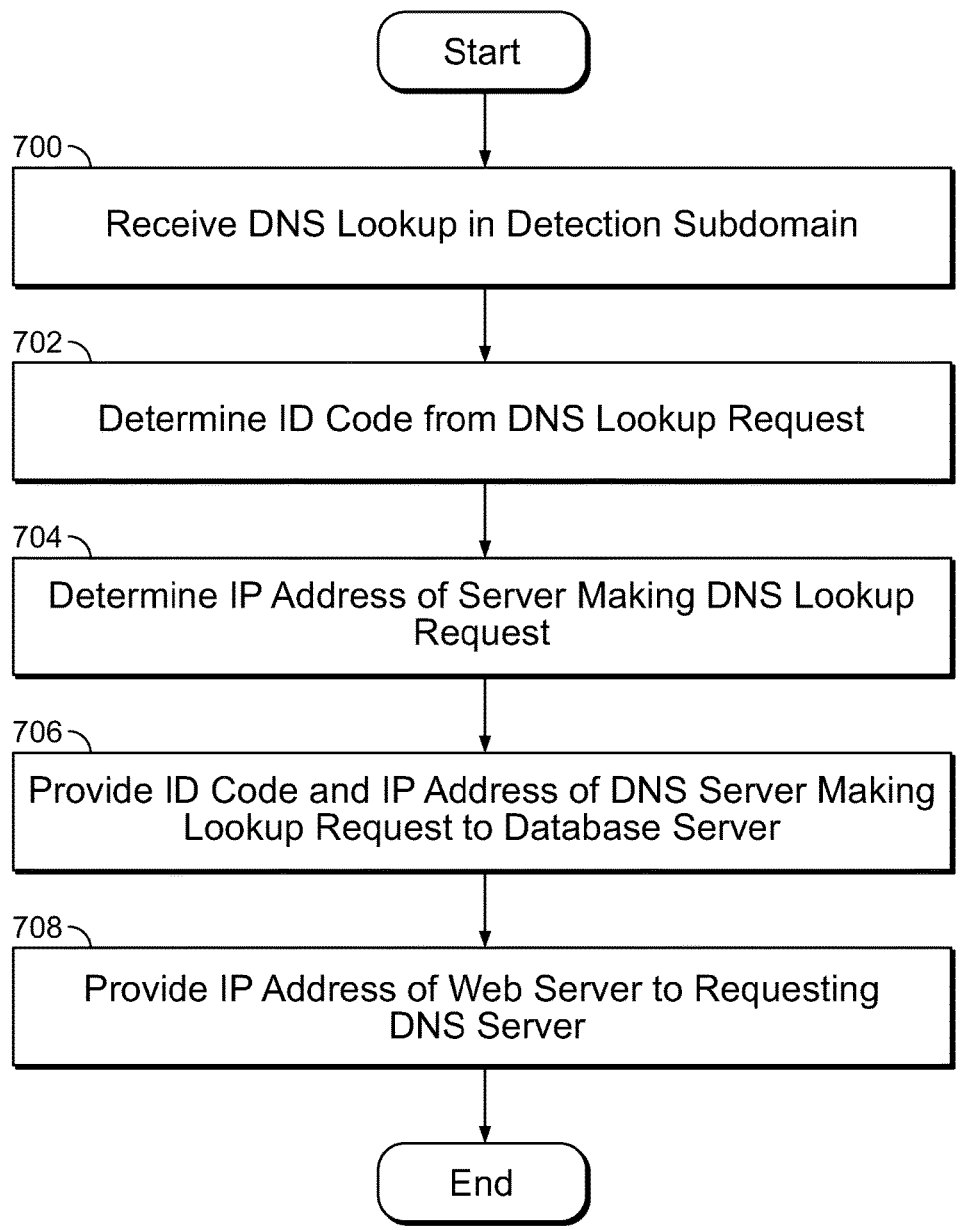
FIG. 7 is a flow diagram illustrating an embodiment of a process for a modified DNS server system.

FIG. 7 is a flow diagram illustrating an embodiment of a process for a modified DNS server system. In some embodiments, the process of FIG. 7 is executed by modified DNS server system 404 of FIG. 4. In some embodiments, the modified DNS server system comprises a content provider DNS server. In the example shown, in 700, a DNS lookup request in a detection subdomain is received. For example, the request is received from the Internet facing DNS server. In 702, an ID code is determined from the DNS lookup request. In some embodiments, the ID code comprises a hostname within the detection subdomain (e.g., "test123" of "test123.dnswhoami.example.com"). In 704, the IP address of the server making the DNS lookup request is determined. For example, as per standard Internet protocols, the IP address of the server making the DNS lookup request is included as part of the DNS lookup request. In 706, the ID code and the IP address of the DNS server making the lookup request are provided to a database server (e.g., database server system 408 of FIG. 4). In some embodiments, the ID code and the IP address of the DNS server providing the lookup request are stored by the database server. In some embodiments, the ID code and the IP address of the DNS server making the lookup request are stored by the database server as a key—value pair (e.g., the database server is configured to provide a value from the database in response to an input key; the ID code is stored as the key and the IP address of the DNS server making the lookup request is stored as the value). In 708, the IP address of a web server (e.g., web server 406 of FIG. 4) is provided to the requesting DNS server.

Figure 8:
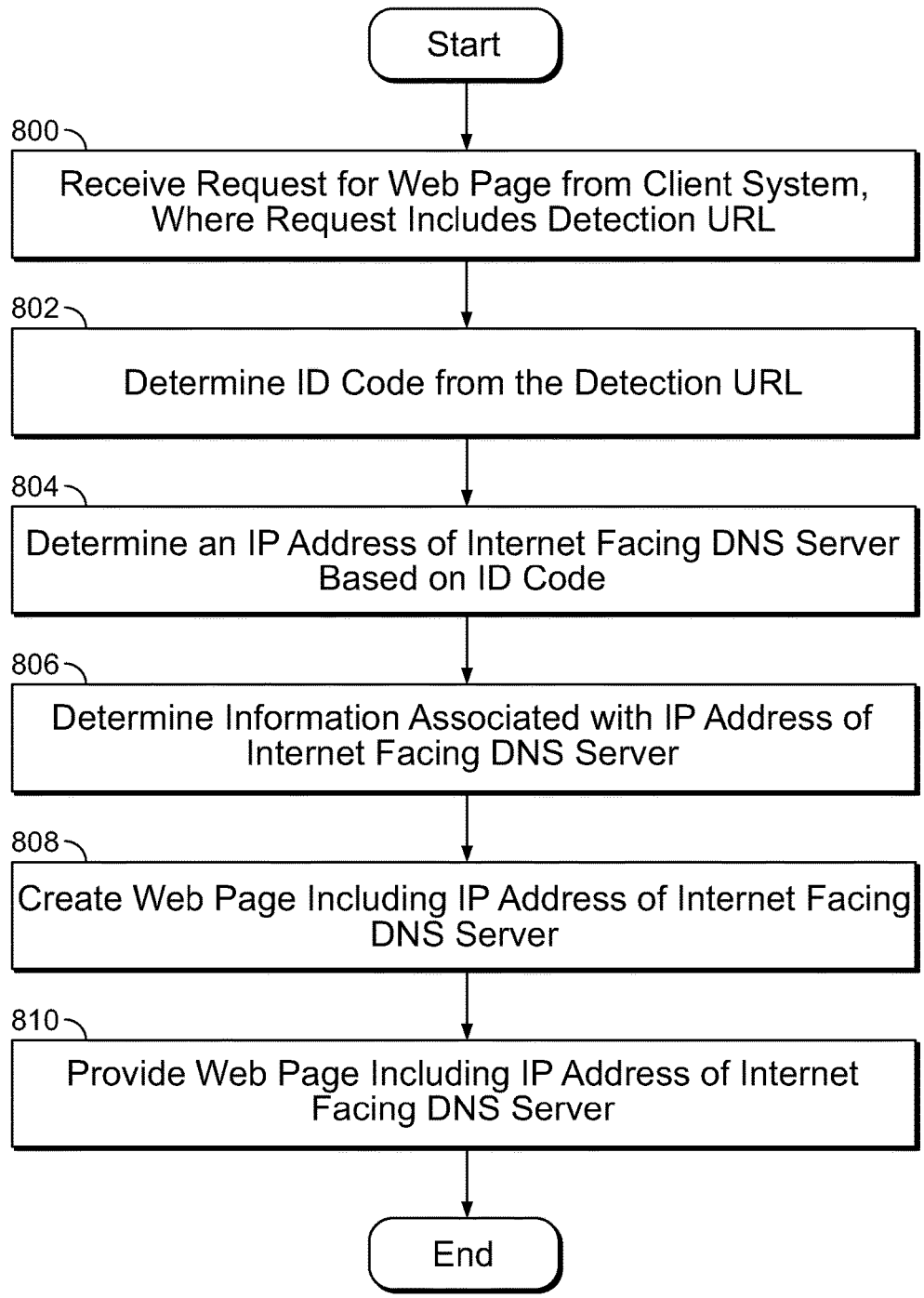
FIG. 8 is a flow diagram illustrating an embodiment of a process for determining an IP address.

FIG. 8 is a flow diagram illustrating an embodiment of a process for determining an IP address. In some embodiments, the process of FIG. 8 is executed by a web server (e.g., web server 406 of FIG. 4). In the example shown, in 800, a request is received for a web page from a client system, wherein the request includes a detection URL. In some embodiments, the request is provided to the web server by the client system after the client system performs a DNS lookup of the detection URL and receives in response the IP address of the web server. In 802, the web server determines an ID code from the detection URL. In some embodiments, the ID code is determined from the hostname component of the detection URL in the same way as it is determined by the modified DNS server in the process of FIG. 7. In 804, an IP address of an Internet facing DNS server is determined based at least in part on the ID code. In some embodiments, determining the IP address of the Internet facing DNS server comprises providing the ID code to a database server in a query. In some embodiments, determining the IP address of the Internet facing DNS server comprises receiving the IP address from a database server (e.g., in response to the ID code). In 806, information associated with the IP address is determined. In some embodiments, information associated with the IP address comprises a geolocation associated with the IP address. In 808, the web page is created (e.g., the web page requested in 800), including the IP address of the Internet facing DNS server. In some embodiments, the web page additionally comprises the information associated with the IP address of the Internet facing DNS server. In 810, the web page is provided, wherein the web page includes the IP address of the Internet facing DNS server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining an IP address of an Internet facing DNS server, comprising:
   an input interface configured to:
      receive a request for a web page from a client system, wherein the client system comprises the Internet facing DNS server in communication with a user of the client system, wherein the request includes a detection URL; and
   a hardware processor configured to:
      determine an ID code from the detection URL;
      determine the IP address of the Internet facing DNS server based at least in part on the ID code;
      determine a distance between an internet facing DNS server geolocation and a user geolocation; and
      provide, using the web page, one or more of the following: the internet facing DNS server geolocation or the distance between the internet facing DNS server geolocation and the user geolocation.

2. The system of claim 1, wherein the request for the web page is received by a content provider web server.

3. The system of claim 1, wherein determining the IP address of the Internet facing DNS server comprises providing the ID code to a content provider database server in a query.

4. The system of claim 3, wherein determining the IP address of the Internet facing DNS server comprises receiving the IP address of the Internet facing DNS server from the content provider database server.

5. The system of claim 1, wherein the processor is further to determine the Internet facing DNS server geolocation.

6. The system of claim 1, wherein the client system receives an indication of an address of an initiation page.

7. The system of claim 1, wherein the processor is further to determine the geolocation of the user.

8. The system of claim 7, wherein the user geolocation is verified.

9. The system of claim 7, wherein a distance is determined between the Internet facing DNS server geolocation and the user geolocation that is verified.

10. The system of claim 1, wherein a client system causes a DNS lookup of a detection hostname.

11. The system of claim 10, wherein the DNS lookup is performed using the Internet facing DNS server.

12. The system of claim 10, wherein the DNS lookup contacts a content provider DNS server.

13. The system of claim 12, wherein the content provider DNS server determines the ID code from the detection hostname.

14. The system of claim 12, wherein the content provider DNS server determines the IP address of the Internet facing DNS server.

15. The system of claim 14, wherein the content provider DNS server causes the IP address of the Internet facing DNS server to be stored associated with the ID code.

16. The system of claim 15, wherein the IP address of the Internet facing DNS server and the ID code are stored in a database as a key—value pair.

17. The system of claim 15, wherein the IP address of the Internet facing DNS server and the ID code are stored by the content provider database server.

18. The system of claim 10, wherein a content provider web server IP address is provided to the client system.

19. The system of claim 1, wherein determining the IP address of the Internet facing DNS server comprises retrieving the IP address of the Internet facing DNS server from a database based at least in part on the ID code, wherein the ID code and the IP address of the Internet facing DNS server are associated and stored in the database.

20. The system as in claim 1, wherein in response to a determination that the distance between the Internet facing DNS server geolocation and the user geolocation exceeds a threshold, include in the web page an indication that the distance is excessive.

21. A method for determining an IP address of an Internet facing DNS server, comprising:
    receiving a request for a web page from a client system, wherein the client system comprises the Internet facing DNS server in communication with a user of the client system, wherein the request includes a detection URL; and
    determining, using a hardware processor, an ID code from the detection URL;
    determining the IP address of the Internet facing DNS server based at least in part on the ID code;
    determining a distance between an Internet facing DNS server geolocation and a user geolocation; and
    providing, using the web page, one or more of the following: the Internet facing DNS server geolocation or the distance between the Internet facing DNS server geolocation and the user geolocation.

22. A computer program product for determining an IP address of an Internet facing DNS server, the computer program product being embodied in a non-transitory computer readable storage medium and comprising computer instructions for:
    receiving a request for a web page from a client system, wherein the client system comprises the Internet facing DNS server in communication with a user of the client system, wherein the request includes a detection URL; and
    determining, using a hardware processor, an ID code from the detection URL;
    determining the IP address of the Internet facing DNS server based at least in part on the ID code;
    determining a distance between the Internet facing DNS server geolocation and a user geolocation; and
    providing, using the web page, one or more of the following: the Internet facing DNS server geolocation or the distance between the Internet facing DNS server geolocation and the user geolocation.

* * * * *